(12) United States Patent
Moradian

(10) Patent No.: US 7,048,098 B1
(45) Date of Patent: May 23, 2006

(54) TOROIDAL ROTARY DAMPER APPARATUS

(76) Inventor: Norick B. Moradian, 2120 Eunice St., Berkeley, CA (US) 94709

( * ) Notice: Subject to any disclaimer, the term of this patent is extended or adjusted under 35 U.S.C. 154(b) by 128 days.

(21) Appl. No.: 10/294,019

(22) Filed: Nov. 12, 2002

(51) Int. Cl.
*F16F 9/14* (2006.01)

(52) U.S. Cl. ........................ 188/306; 188/290

(58) Field of Classification Search ............... 188/266, 188/130, 290–310, 269; 16/51, 57, 58; 280/124.154; 180/227; 92/120; 267/223; 74/574, 573 F; 244/104 FP
See application file for complete search history.

(56) References Cited

U.S. PATENT DOCUMENTS

| 1,940,694 | A | * | 12/1933 | Peo | ........................ | 29/888.042 |
| 2,018,051 | A | * | 10/1935 | Carter | ........................ | 188/298 |
| 2,027,423 | A | * | 1/1936 | Gardiner | ........................ | 16/84 |
| 2,038,533 | A | * | 4/1936 | Bliss et al. | ................ | 188/269 |
| 2,301,318 | A | * | 11/1942 | Peo | ........................ | 188/277 |
| 2,329,923 | A | * | 9/1943 | Magrum | ................ | 188/284 |
| 2,790,520 | A | * | 4/1957 | Kuhn, Jr. | ................ | 188/307 |
| 4,886,149 | A | | 12/1989 | Uehara et al. | | |
| 4,926,984 | A | | 5/1990 | Pollitt | | |
| 5,324,065 | A | | 6/1994 | Derrien et al. | | |
| 5,381,877 | A | | 1/1995 | Kobayashi | | |
| 5,400,878 | A | | 3/1995 | D'Anna et al. | | |
| 5,577,761 | A | | 11/1996 | Tabata | | |
| 6,296,090 | B1 | | 10/2001 | Oliver et al. | | |

FOREIGN PATENT DOCUMENTS

JP 11-37201 * 2/1999

* cited by examiner

*Primary Examiner*—Pam Rodriguez
(74) *Attorney, Agent, or Firm*—Thomas R. Lampe

(57) ABSTRACT

A toroidal rotary damper apparatus includes a housing having a toroidal inner housing surface and a piston moveable in the housing having a curved outer peripheral piston surface in engagement with the inner housing surface. A fluid barrier is attached to the housing and located in the housing interior. A flow control passageway defined by either the piston or the fluid barrier controls passage of damper fluid when there is relative rotational movement between the piston and the housing to dampen the forces causing relative rotational movement.

27 Claims, 13 Drawing Sheets

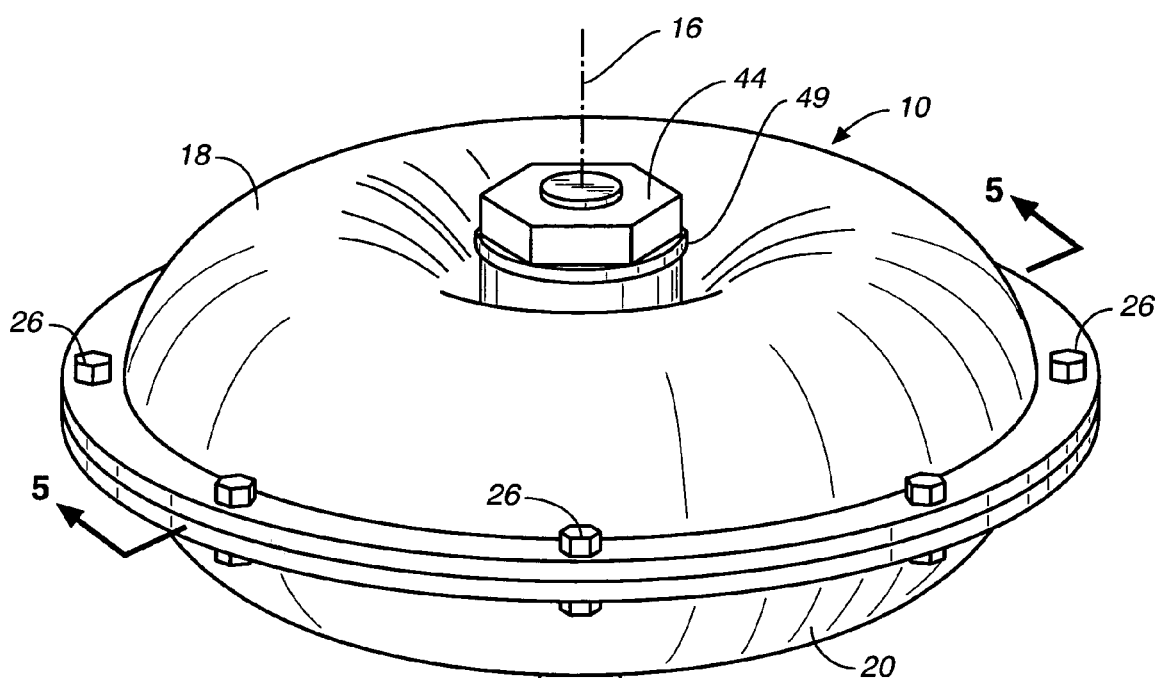
FIG._1
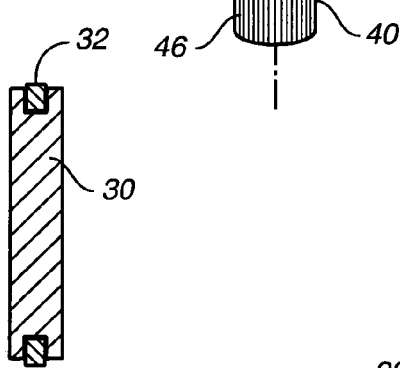
FIG._3
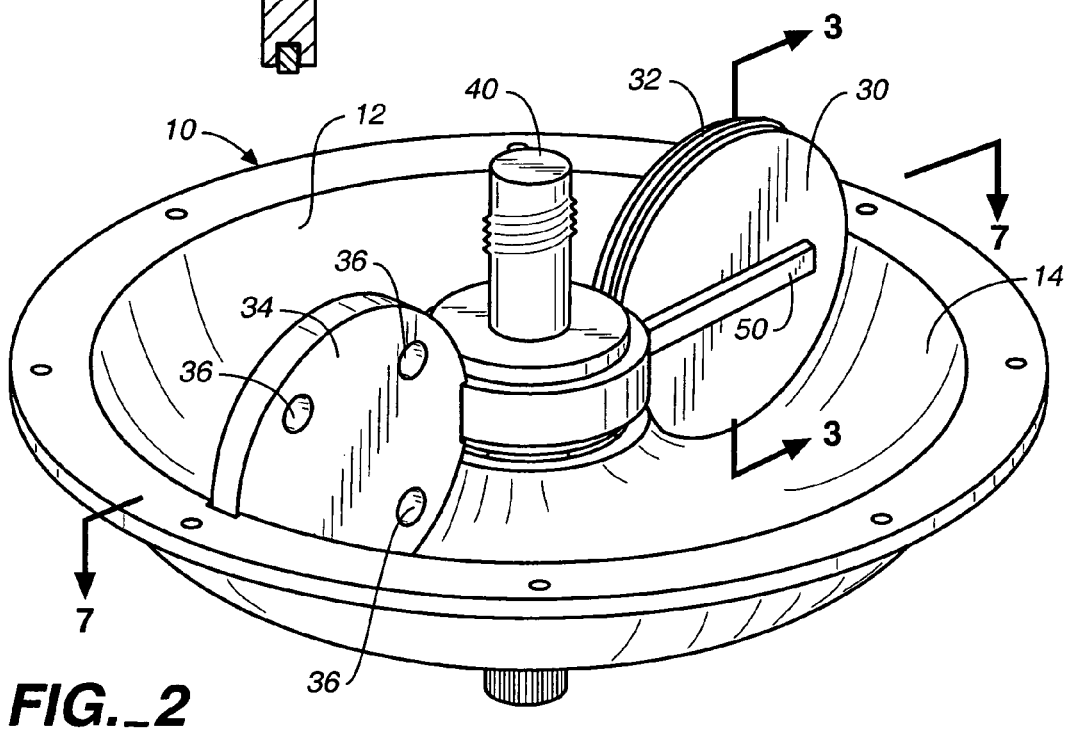
FIG._2

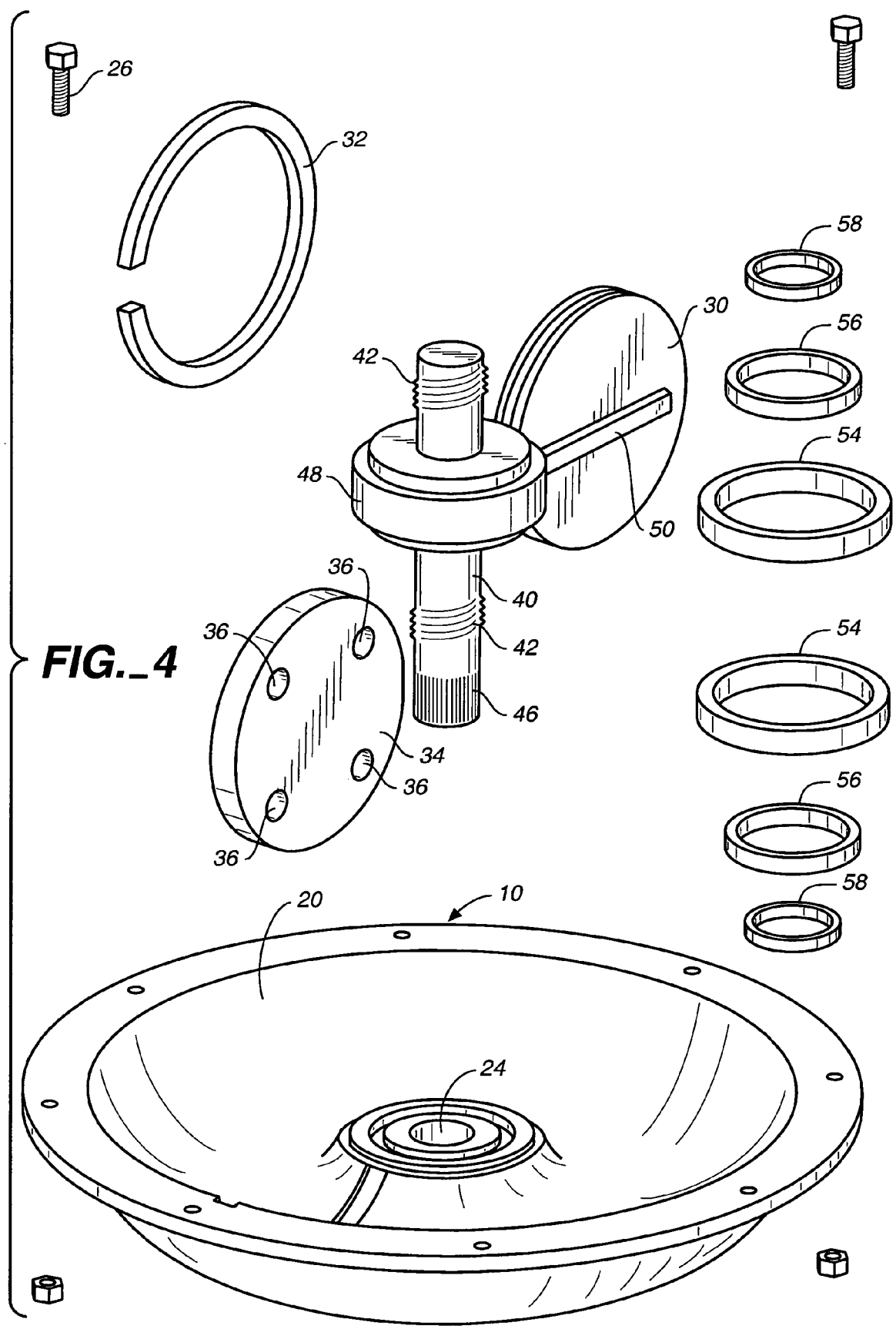
FIG._4

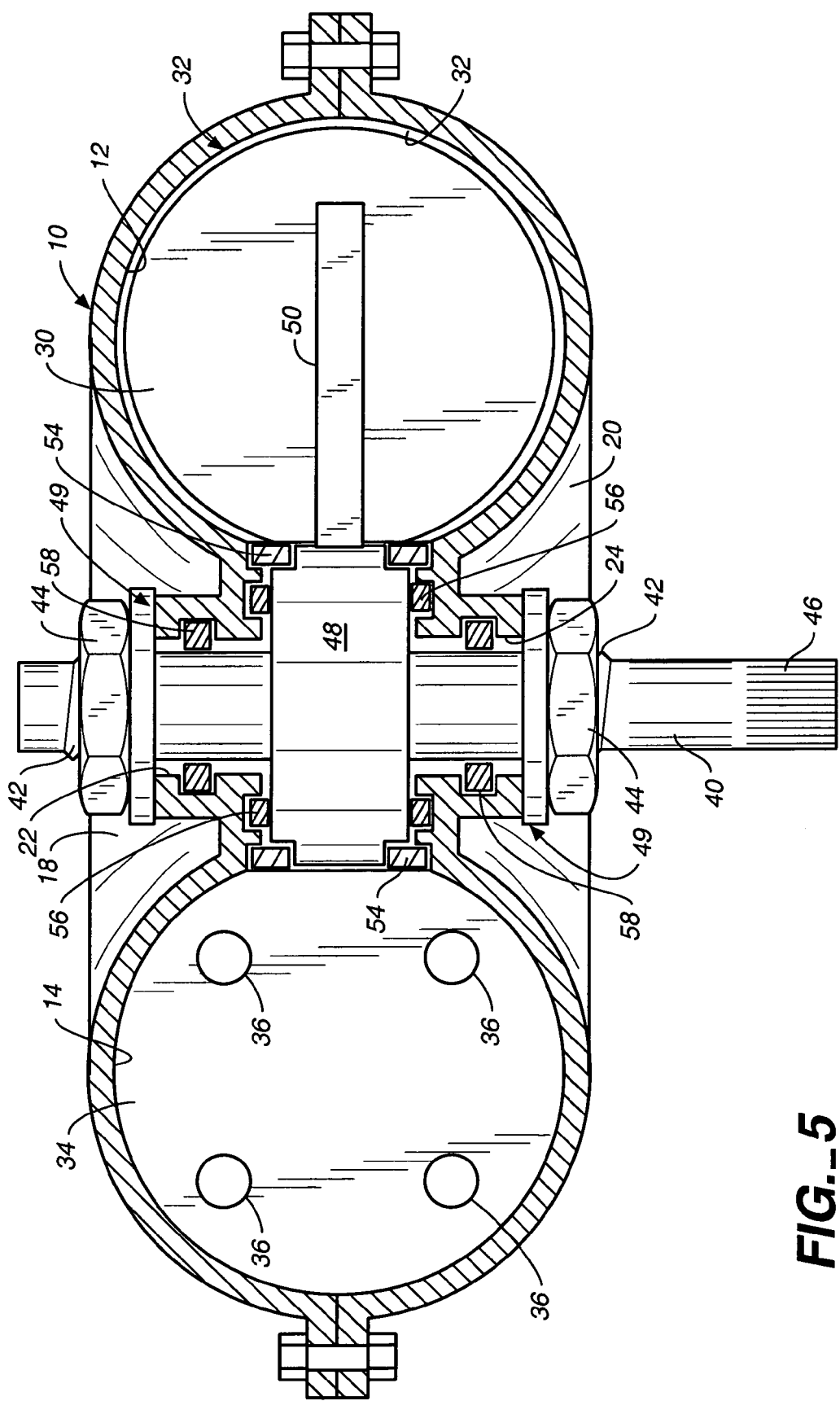
FIG._5

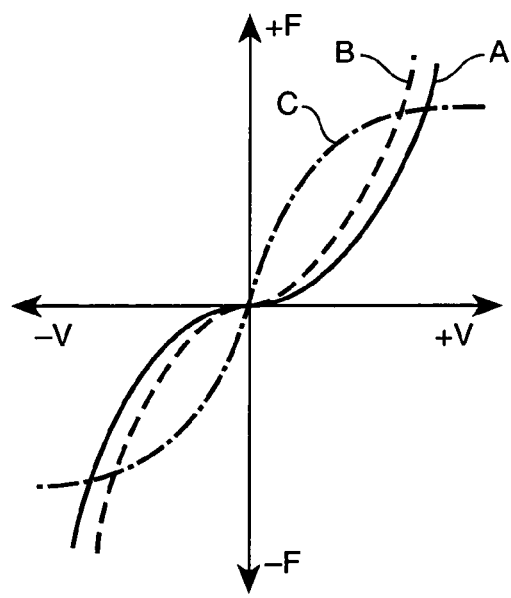
FIG._6
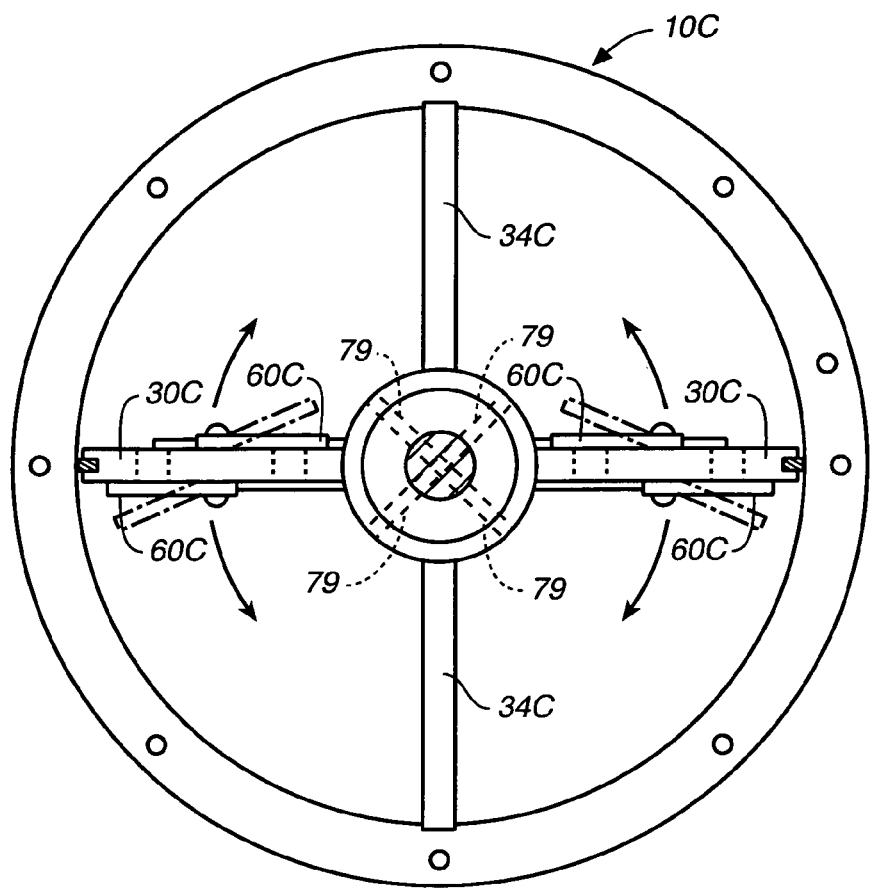
FIG._9

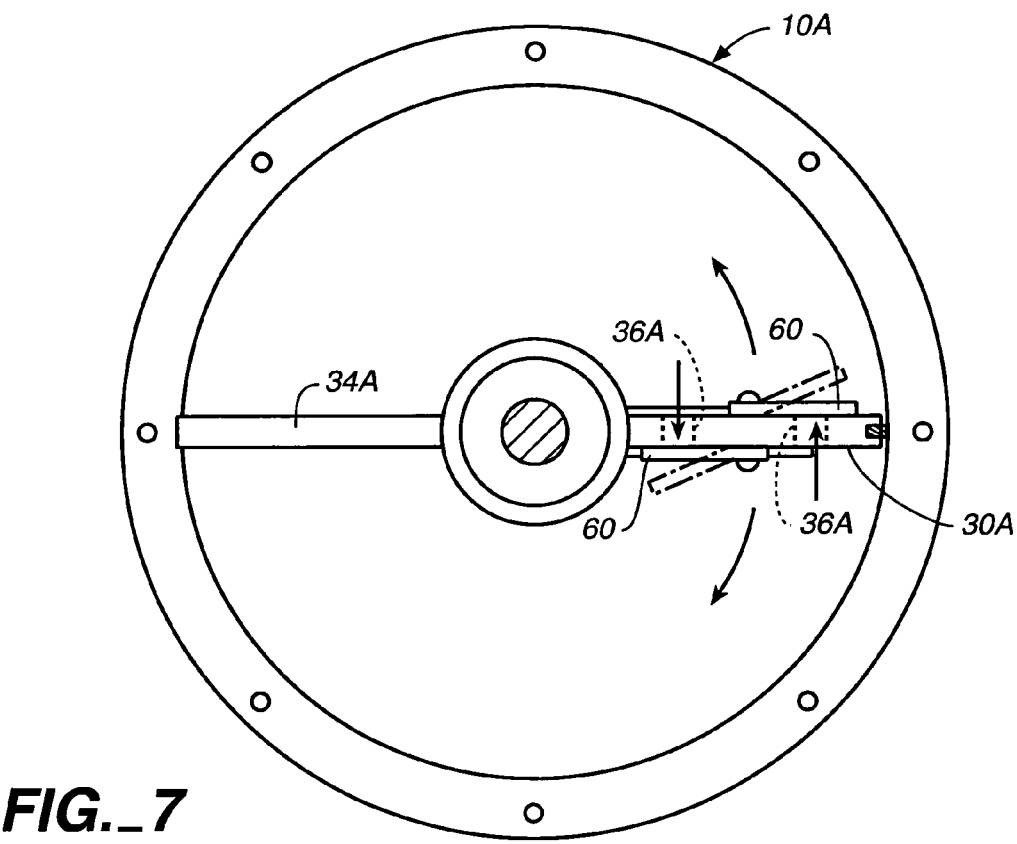
FIG._7
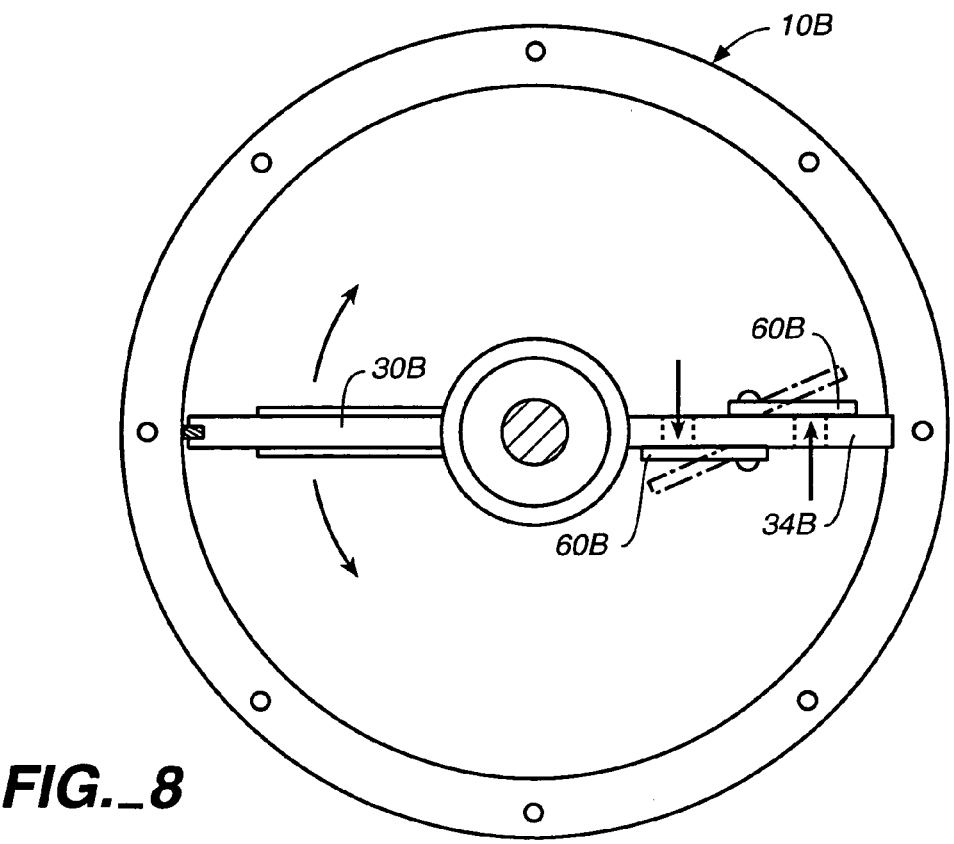
FIG._8

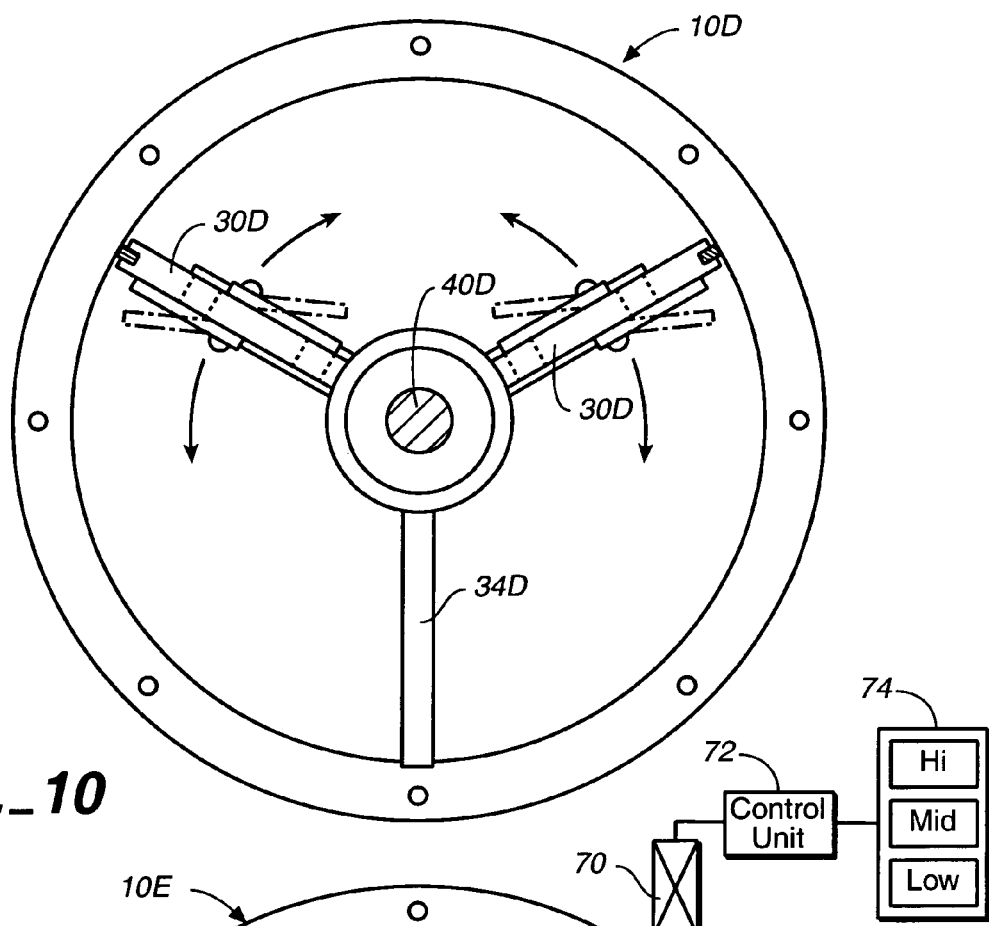
FIG._10
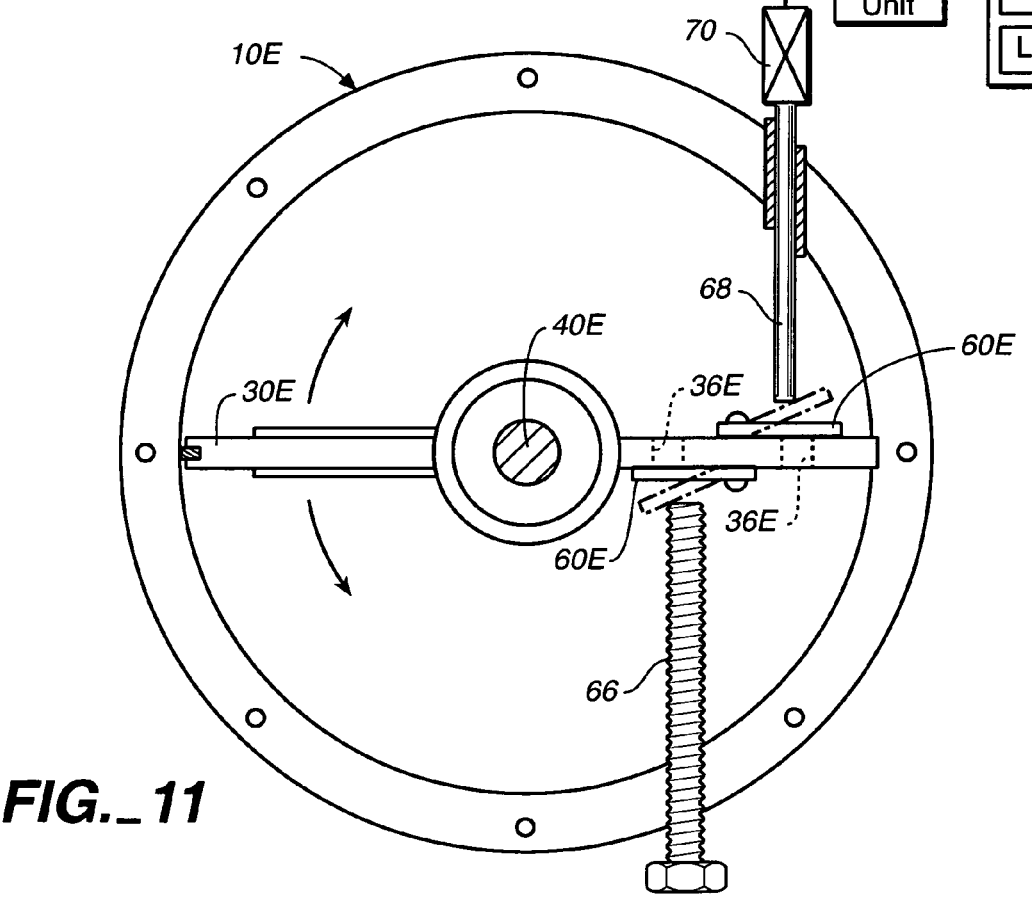
FIG._11

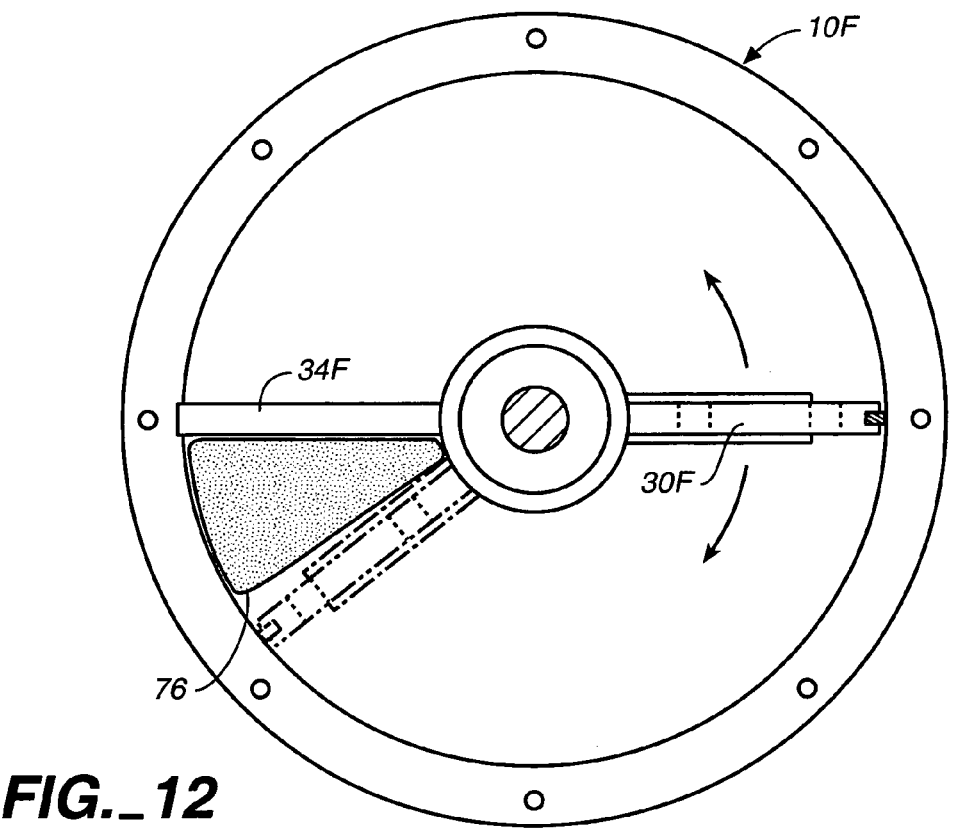
FIG._12
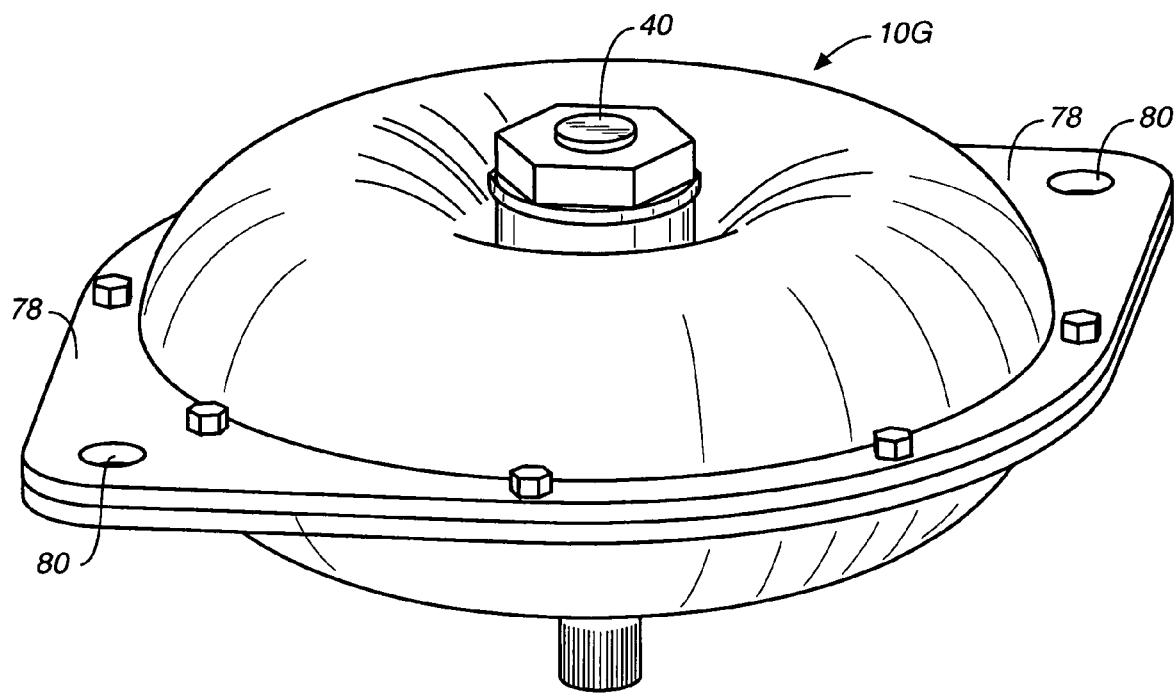
FIG._13

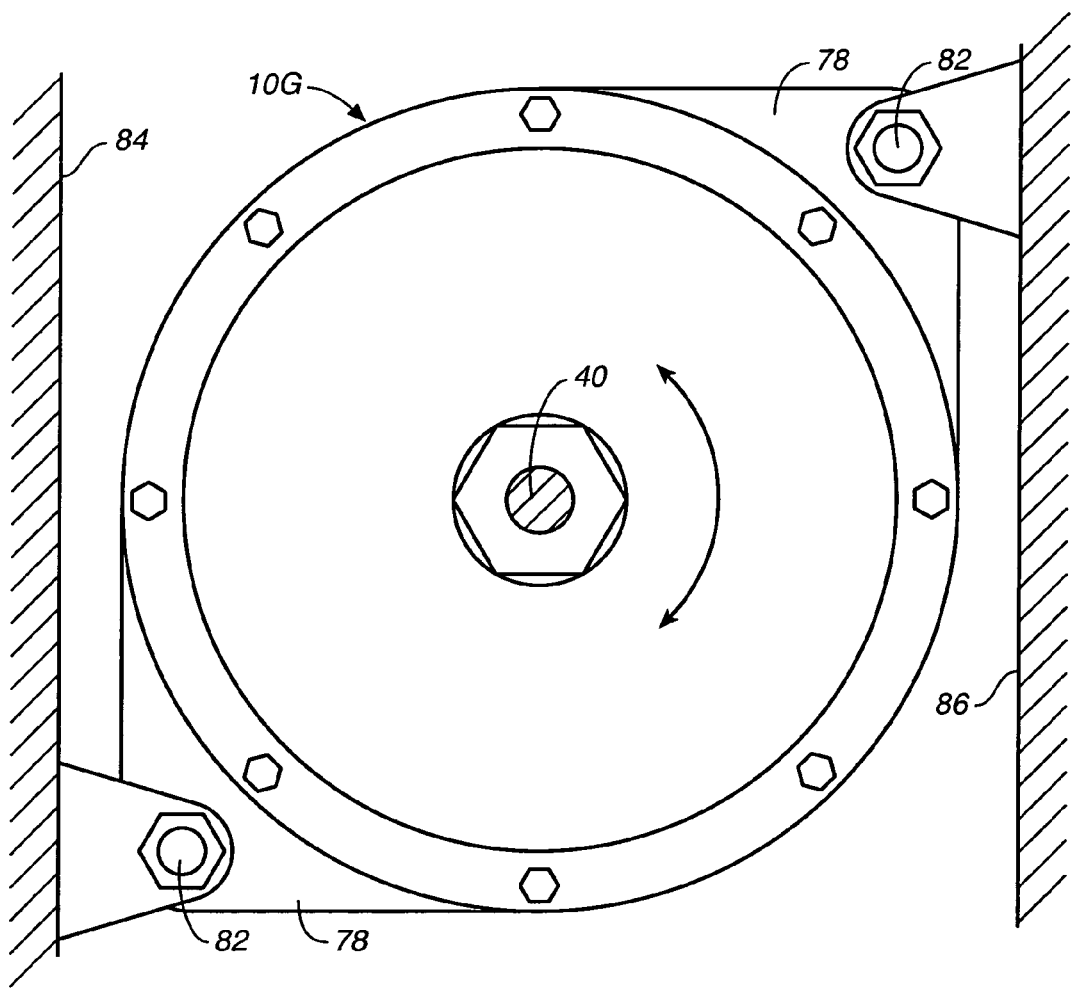
FIG._14
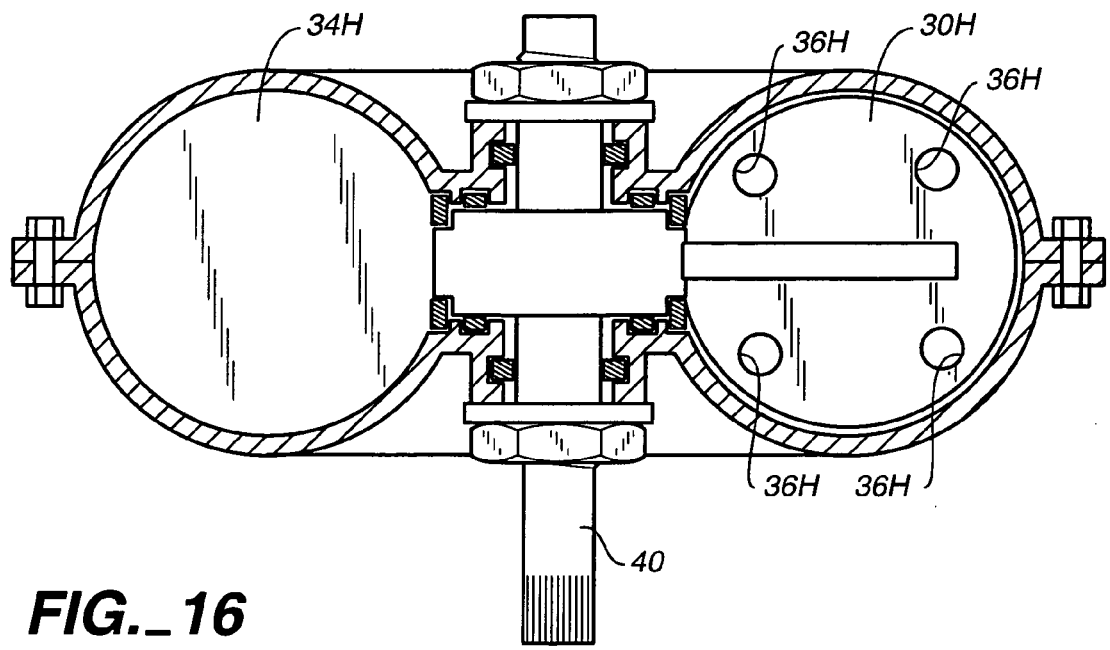
FIG._16

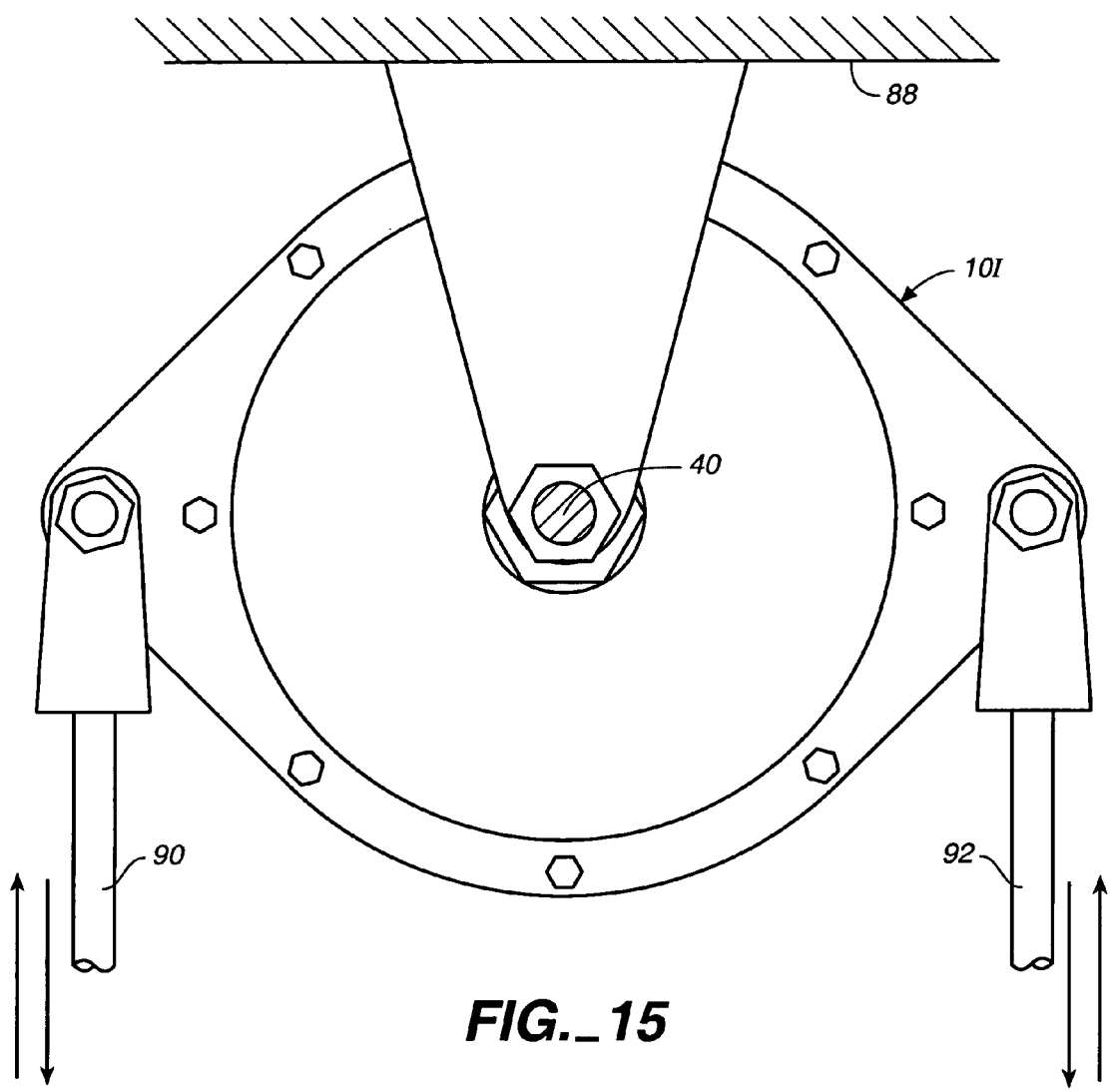
FIG._15

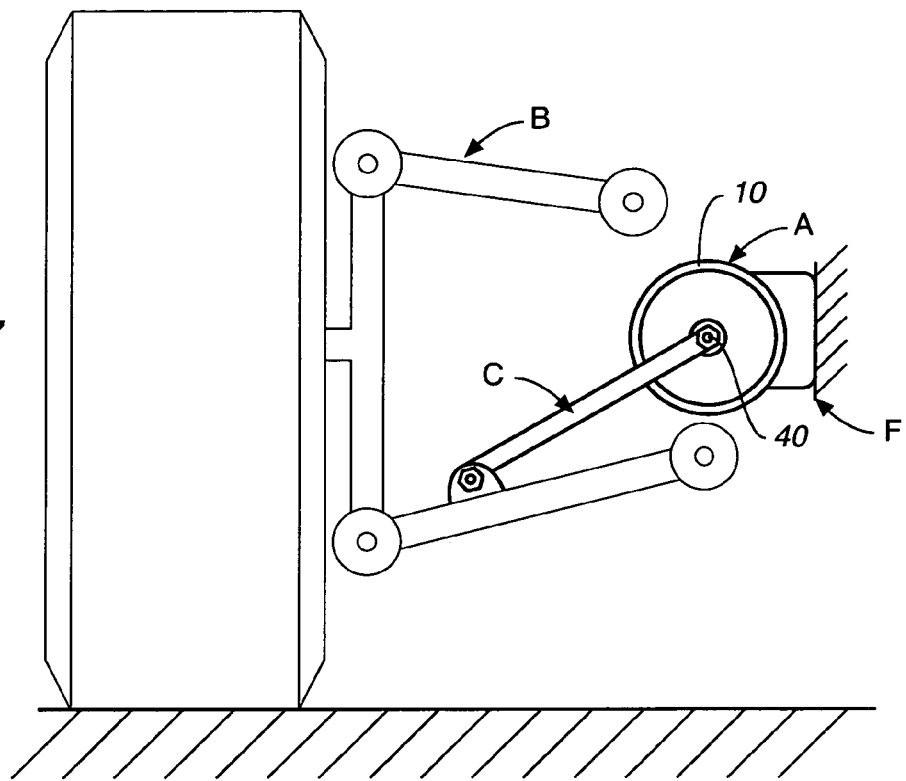
FIG._17
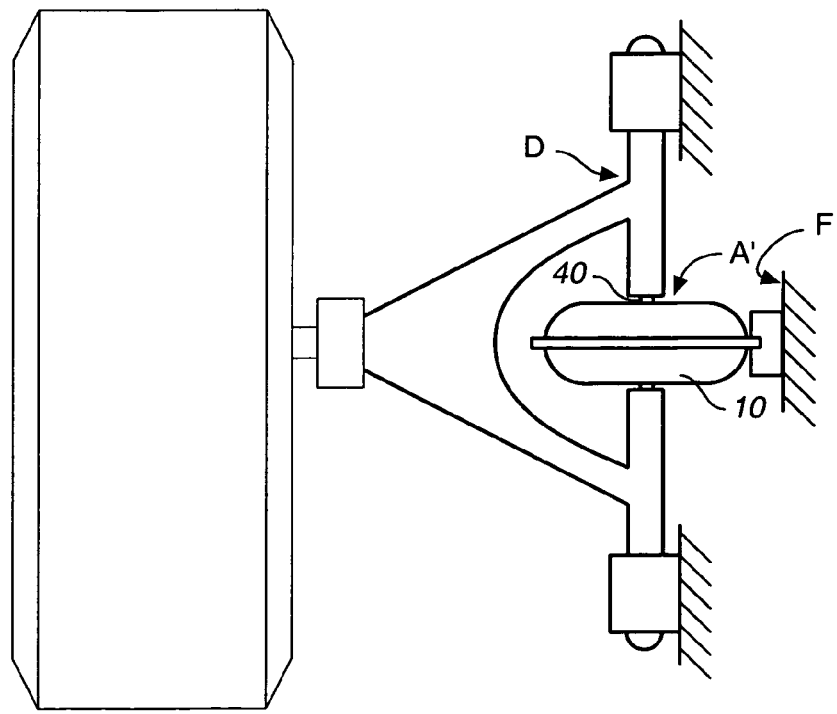
FIG._18

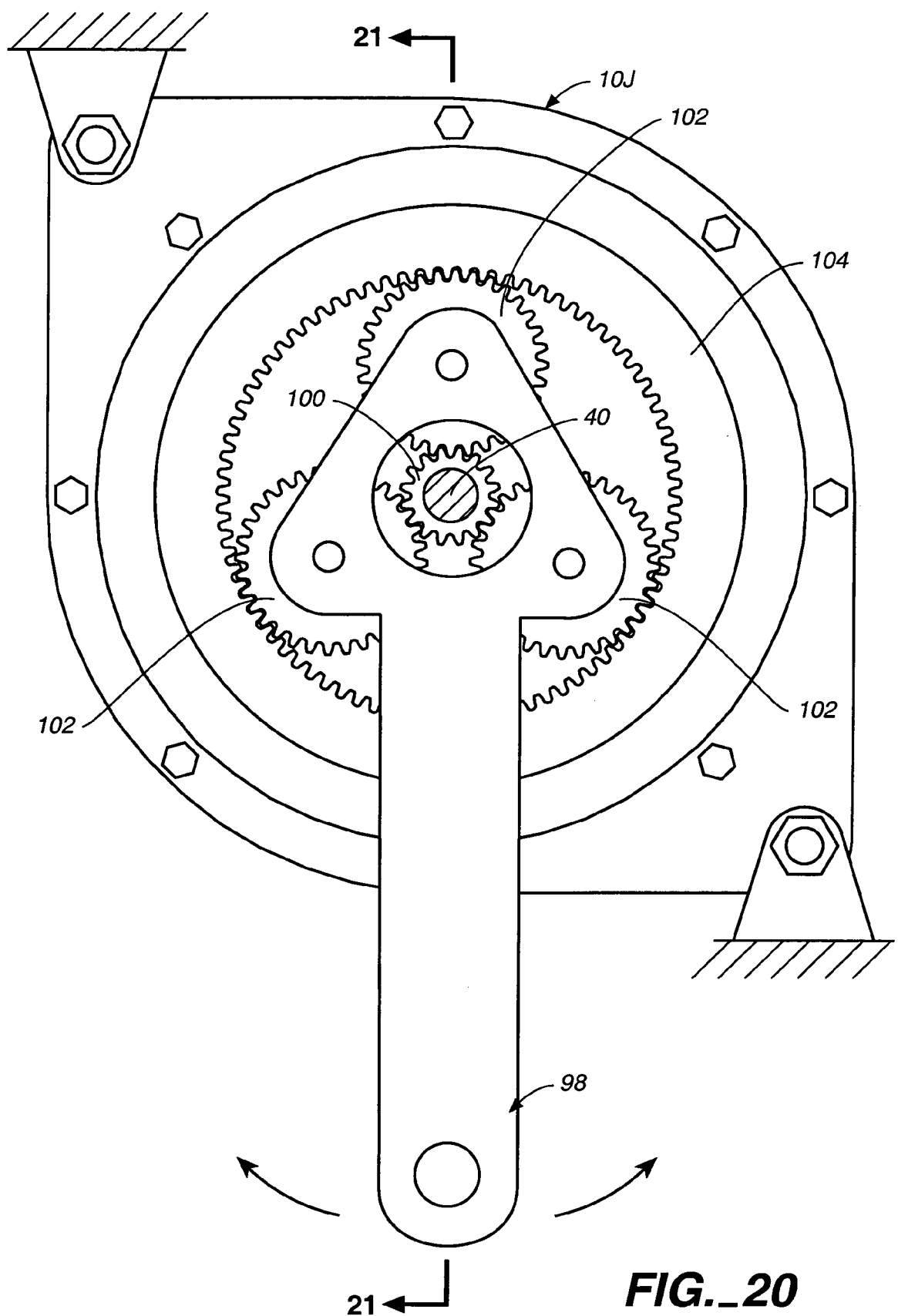
FIG._20

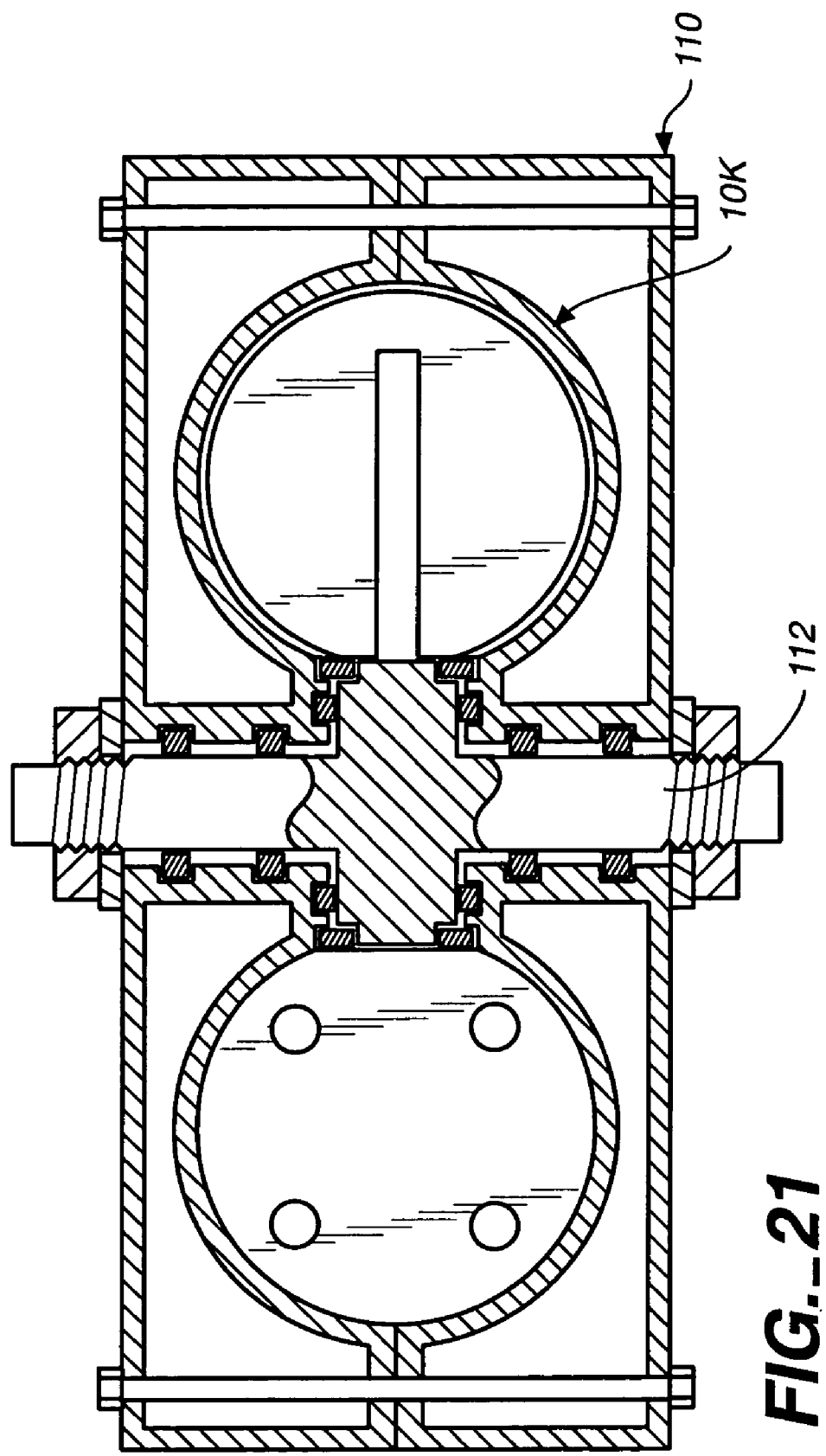
FIG._21

TOROIDAL ROTARY DAMPER APPARATUS

TECHNICAL FIELD

This invention relates to damper apparatus for dampening a force, for example a force caused by relative movement between two structural elements operatively associated with the damper apparatus.

BACKGROUND OF THE INVENTION

Dampers are hydraulic devices used to restrict the number of cyclic oscillations caused by a deflection force; damping forces are generated by pumping fluid through regulating orifices, converting kinetic energy into laminar and turbulent friction. Two types of damping devices are currently in wide use; telescopic and rotary vane type. Traditional van type rotary dampers have inherent disadvantages, including the following:

1. Hysteresis, due to disproportionate vane and shaft seal pre-load; caused by means such as compression springs, Elastomers, band springs or Elastomer Composites, resulting in frictional losses and limited dynamic range;
2. A rotary vane damper housing is subject to hoop stress, compression deformation and bending strain at vane junctions, causing excessive bypass flow and subsequent loss of compression; and
3. Thermal hysteresis due to non-uniform coefficient of expansion; exasperated by long sealing contours of the vane and structural components, leading to unpredictable sealing properties at higher temperatures and friction at lower temperatures. This limits the operating temperature range and diminishes the damping characteristics during thermal cycles. Furthermore, such prior art devices are hampered by their relative complexity, weight and high cost.

The following U.S. patents disclose rotary dampers believed to be representative of the current state of the prior art: U.S. Pat. No. 4,926,984, issued May 22, 1990, U.S. Pat. No. 5,577,761, issued Nov. 26, 1996, U.S. Pat. No. 5,324,065, issued Jun. 28, 1994, U.S. Pat. No. 4,886,149, issued Dec. 12, 1989, U.S. Pat. No. 5,400,878, issued Mar. 28, 1995, U.S. Pat. No. 5,381,877, issued Jan. 17, 1995, and U.S. Pat. No. 6,296,090, issued Oct. 2, 2001.

Telescopic piston dampers are well known constructions employing a pressurized chamber or cylinder having a piston movable therein under controlled conditions and a piston rod associated therewith to provide the transfer of dampening force. These traditional-type dampers have certain fundamental drawbacks as well. In such devices, due to the fact that the piston rod passes through one end of the damper, there is a dynamic internal pressure differential due to rod volume inclusion, necessitating measures to counter the rod volume by either pressurizing the opposing chamber by means of highly compressed gas and a dividing piston, as in a monotube gas design, or a secondary chamber, via a foot valve, as in the known double-tube design, or by inclusion of a complimentary dummy shaft to equalize internal volume. All of the above measures reduce damping efficiency, add cost, complexity and weight as well as require substantial space.

Since telescopic dampers, to conform to non-linear elasto-kinematics motion of the associate elements, are deployed predominantly with translational mechanisms, they can not be installed directly, or fixedly to a haul or a chassis. This curtails the thermal conductance capacity of the damper and of the fluid. Under severe operating conditions, fluid temperature can rise to well over 100 degrees C., resulting in localized fluid vaporization and creation of gas pockets, known as Cavitation. At higher temperatures, damping forces diminish exponentially due to fluid viscosity reduction, giving higher orifice discharge coefficient. Also, conventional translational or linear dampers have limitations when applied to long travel functions. It is difficult to accommodate a large travel due to the danger of bucking the damper shaft, especially at high relative velocities, the linear space claim required by the length of a linear damper can also create packaging problems.

Functionally, in order to achieve the desired damper force-velocity characteristics, it is very difficult to adjust the piston-valve; solutions such as a hollow piston rod containing an internal shaft that performs the adjustments being very costly and often incompatible with servo controls due to high torque demands. Piston embedded servo valves are also complex, as well as reducing the hydraulic capacity of the damper.

As described earlier, to adapt to non-linear and elasto-kinematic requirements of the damping structures, telescopic dampers are predominantly deployed via translational bushings, excluding the possibility of direct attachment of damper to the structures, hence impeding a heat transfer passage.

My U.S. Pat. No. 5,971,118, issued Oct. 26, 1999, discloses a motion dampening apparatus which includes a damper housing defining a curved damper housing interior for a fixed attachment to a first structural member and a curved damper element for a fixed attachment to a second structural member and movable within the curved damper housing interior along a curved path of movement.

While the prior art indicated above does not teach or suggest the combination of structural features disclosed and claimed herein, it demonstrates the viability of the novel concept of transition of a force-bearing piston within a radial or circular structure; it also teaches the importance of fixed attachment of a damper to its associate structural members resulting in a thermally conducting pathway between a damper and a structure, as well as eliminating the use of translational bushings from the damper mounting points, which are also a source of parasitic friction.

DISCLOSURE OF INVENTION

The present invention relates to a toroidal rotary damper apparatus which has a number of advantages over prior art damper constructions. The toroidal rotary damper apparatus has excellent sealing properties due to constant contact between a piston employed in the apparatus and the interior of a toroidal shaped housing. Due to symmetrical geometry of the piston and the surrounding arcous interior, the piston or the shaft seals do not require a pre-load force, this considerably reduces internal friction and hysteresis. The apparatus has a low internal static pressure and has a constant internal volume, eliminating the need for a high pressure gas chamber or secondary expansion chamber to compensate for an external rod.

The damping torque T generated by the toroidal rotary damper is determined by volume of fluid displaced per angle of rotation $\theta$, times the pressure drop across the piston $\Delta P$ or:

$$T = \pi \theta \Delta P R^2 r^2$$

where: $\theta$=angle in radian, $\Delta P$=pressure drop across the piston, R=radius of the toroid, and r=radius of the damper piston.

The following relation converts rotary to linear motion: $x=2\pi R\theta/360$. The damping rate is determined by the rate of change of $\Delta P$, or rate at which the damping fluid is allowed to leak from the pressurized chamber across the piston orifices and valves. Additionally, over a 90 degree sweep, mean toroidal volume displacement is 5% larger, hence generating 5% more damping force, than the equivalent linear displacement.

Furthermore, behavior of conventional telescopic damper is well understood, comprehensive mathematical models and fluid-dynamic simulations have been developed to analyze the characteristics, since the toroidal rotary damper employs piston, valving and cylindrical configuration substantially similar to that of telescopic dampers, all relevant analysis are directly applicable to the toroidal rotary damper system.

A toroidal rotary damper constructed in accordance with the present invention operates according to the following operating principle.

The apparatus has a wide dynamic damping range, approaching 340 degrees, as well as good thermal distribution due to a high rate of fluid circulation and good thermal stability due to efficient heat dissipation throughout the apparatus exterior. The apparatus does not posses any inherent stress points due to excellent load distribution of the piston surface area against the interior of the torus.

The apparatus is relatively simple and low cost, also providing the advantages of full external adjustability during operation and ease of servicability due to the modular construction thereof.

The damper apparatus is relatively compact and adapted for installation even in restricted locations. The apparatus can accept forces through a central shaft thereof or at locations on the housing thereof and still effectively and efficiently provide damping. Toroidal rotary damper may be configured either internally within a suspension or a structure, or attached via a lever arm and linkage. In addition toroidal rotary damper has smaller space requirement, no exposed sealing surfaces and therefore more resistance to debris and damage from foreign objects in harsh environments.

The toroidal rotary damper apparatus of the invention includes a housing defining a housing interior for containing damper fluid, said housing interior at least partially formed by a toroidal inner housing surface disposed about and spaced from an axis.

The apparatus includes a piston in the housing interior having a curved outer peripheral piston surface in substantially fluid-tight engagement with the toroidal inner housing surface, spaced from the axis and disposed along a common plane with said axis. The housing and the piston are relatively rotatably moveable about the axis.

A fluid barrier is fixedly attached to the housing and positioned in the housing interior.

A flow control passageway (or control valve) is defined by either the piston or the fluid barrier for permitting controlled passage of damper fluid therethrough responsive to relative rotational movement between the piston and the housing to dampen forces applied to the toroidal rotary damper apparatus causing the relative rotational movement.

Since the thermal expansion coefficient of the fluid is larger than that of the metallic parts of the damper, in certain applications, a low-pressure gas chamber or bladder could be provisioned in the interior of the housing to absorb excessive fluid pressure caused by thermal expansion, preventing formation of gas or vapor bubbles in the fluid. Effectively functioning as a temperature compensation mechanism.

Blow-off valves may also be incorporated in the piston or the fluid barrier to limit the maximum transient pressure at higher piston velocities, in order to avoid damage to the damper.

Other features, advantages and objects of the present invention will become apparent with reference to the following description and accompanying drawings.

BRIEF DESCRIPTION OF DRAWINGS

FIG. 1 is a perspective view of an embodiment of toroidal rotary damper apparatus constructed in accordance with the teachings of the present invention;

FIG. 2 is a perspective view with a housing member of the apparatus removed and illustrating interior structure of the apparatus, including a piston and a fluid barrier;

FIG. 3 is an enlarged, cross-sectional view taken along the line 3—3 in FIG. 2;

FIG. 4 is an exploded, perspective view illustrating selected components of the toroidal rotary damper apparatus;

FIG. 5 is an enlarged, cross-sectional view taken along the line 5—5 of FIG. 1;

FIG. 6 is a graphic representation showing force versus velocity curves for various embodiments of the apparatus;

FIG. 7 is a view taken along the line 7—7 in FIG. 2, but illustrating an alternative embodiment employing valves on the piston;

FIG. 8 is a view similar to FIG. 7, but illustrating another embodiment wherein valves are utilized on the fluid barrier of the apparatus;

FIG. 9 is a view similar to FIGS. 7 and 8, but illustrating yet another embodiment of the invention wherein two fluid barriers are employed and two pistons are employed in the apparatus, each piston having valves associated therewith with chambers interconnected via fluid passageways through the central shaft;

FIG. 10 illustrates an embodiment of the invention wherein a single fluid barrier is provided and operatively associated with two pistons spaced from one another, the pistons incorporating valves;

FIG. 11 illustrates an embodiment utilizing valve controls to externally control operation of valves associated with a fluid barrier;

FIG. 12 illustrates an embodiment of the device incorporating a preload structure for pressurizing damper fluid in the housing interior;

FIG. 13 is a view similar to FIG. 1, but illustrating an alternative form of housing incorporating external connector portions for connecting the housing to structural elements;

FIG. 14 illustrates the housing of FIG. 13 attached to two spaced structural elements;

FIG. 15 illustrates an embodiment of the invention in which the housing has elongated rods attached thereto, the apparatus functioning as a rocker damper;

FIG. 16 is a view similar to FIG. 5, but illustrating a plurality of flow control passageways formed in the piston;

FIG. 17 illustrates the use of toroidal rotary damper apparatus of the present invention in association with a vehicle suspension system and operating in the capacity of a lever damper;

FIG. 18 illustrates the toroidal rotary damper apparatus deployed axially with the pivoted support shaft of a vehicle suspension system and affixed thereto;

FIG. 20 illustrates the toroidal rotary damper apparatus incorporating a planetary gear assembly; and FIG. 21 illustrates the toroidal rotary damper apparatus integrated into an external housing structure.

MODES FOR CARRYING OUT THE INVENTION

Figure 19:
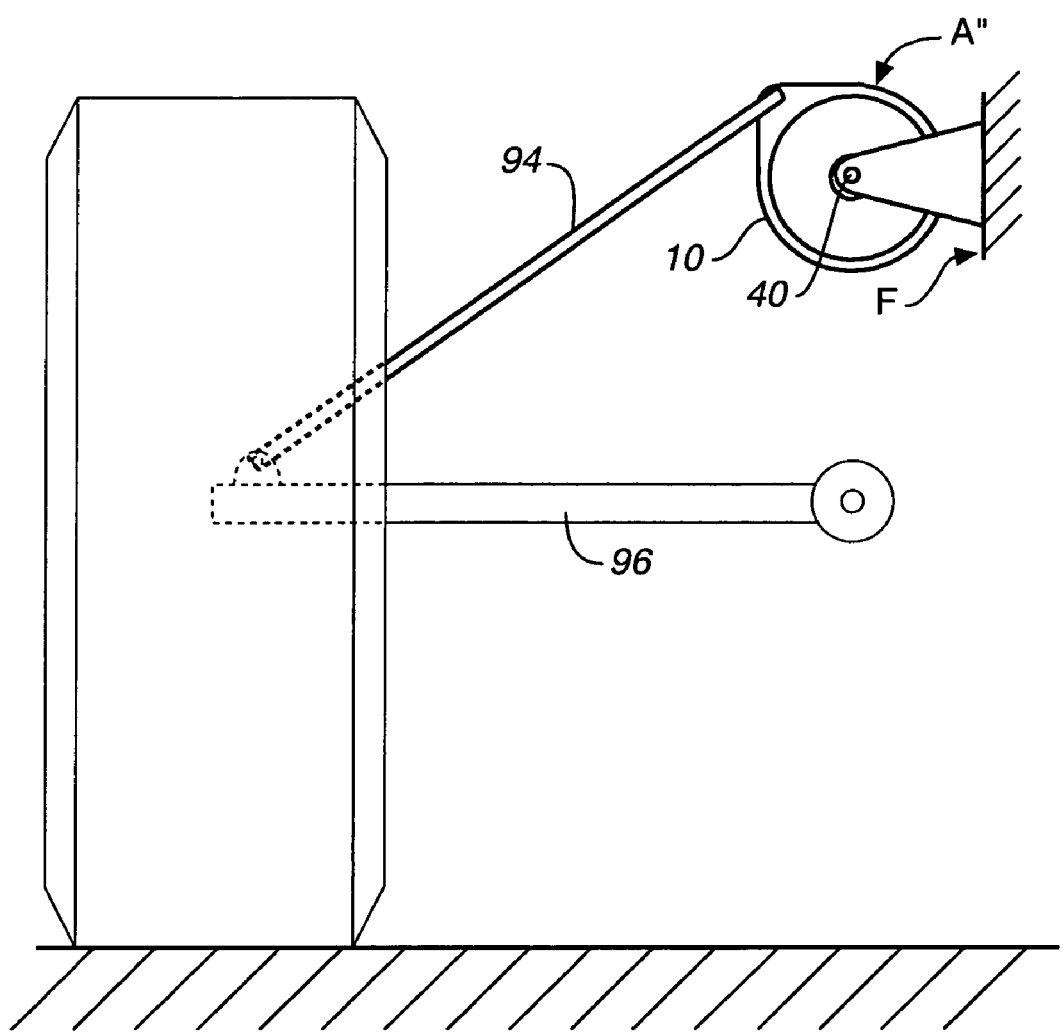
FIG. 19 illustrates the toroidal rotary damper apparatus utilized in a vehicle suspension system to accept tangential force vectors using a push/pull rod and employed as a damped rocker system.

Referring now to FIGS. 1–6, a toroidal rotary damper apparatus constructed in accordance with the teachings of the present invention is illustrated. The apparatus includes a housing 10 defining a housing interior 12 for containing damper fluid (not shown) of any conventional nature. The housing interior has a substantially circular cross section and is formed by a toroidal inner housing surface 14 disposed about and spaced from a central axis 16.

The housing 10 includes two adjoining housing members 18, 20, each housing member defining a portion of the housing interior and further defining openings 22, 24, respectively, at the centers thereof. Threaded fasteners 26 extending through holes in outer flanges of the housing members are utilized to releasably secure the housing members together.

A piston 30 having a substantially circular-shaped outer peripheral piston surface at which is located an outer seal 32 is in substantially fluid-tight, slidable engagement with the toroidal inner housing surface, spaced from axis 16 and disposed along a common plane with the axis 16. The housing 10 and the piston are relatively rotatably moveable about the axis, as will be described in greater detail below.

A fluid barrier 34 in the form of a plate is attached to the housing and positioned in the housing interior.

The fluid barrier 34 defines multiple flow control orifices or passageways 36 which permit restricted passage of damper fluid therethrough responsive to relative rotational movement between the piston 30 and the housing to dampen forces applied to the apparatus causing the relative rotational movement.

A shaft 40 extends through the housing interior along axis 16 and projects outwardly from opposed sides of the housing, the shaft passing through openings 22, 24 of the housing. A shaft end segment extends outwardly of each of the openings and is disposed outside the housing. Threads 42 are formed at two spaced locations on the shaft and the shaft is threadedly engaged at those locations by nuts 44. In the arrangement illustrated, one end 46 of the shaft incorporates elongated, parallel projections to facilitate connection of the shaft to other structure, if desired. The shaft and nuts are rotatable as a unit relative to the housing. Washers 49 are disposed adjacent to nuts 44 and are slidable on shaft 40 to provide a sliding or bearing interface between housing members 18, 20 and the shaft.

Piston 30 is secured to shaft 40 by radially protruding member 48 affixed to shaft. In the embodiment illustrated, elongated securement members 50 extending from member 48 are disposed at opposed sides of the piston 30 to secure the piston to member 48, it should be noted that piston 30 may be attached fixedly to one or multiple securement members, or held unfixedly or freely, from opposing directions, generally referred to as "floating", in between securement members 50.

Relative rotational movement between the housing and the piston about axis 16 will cause pressurized damper fluid in the housing interior to pass through flow control passageways 36 and thus dampen forces resulting in the relative rotational movement.

A number of seals are employed in the apparatus to prevent leakage of the pressurized damper fluid. A compression seal 54 is installed in engagement with each of the housing members at the location of member 48. At these locations, the compression seals surround the shaft and maintain pressurization of damper fluid within the housing interior. In addition, radial seals 56 and axial seals 58 associated with each of the housing members and surrounding the shaft act as fluid stops between the shaft and housing to prevent possible leakage. It should be noted that radial seal 56 may be deleted in some embodiments and applications if sufficiently strong single or multiple axial seals 58 are employed.

FIG. 7 illustrates an embodiment of the invention wherein the housing 10A interior accommodates a fluid barrier 34A which has no flow control valves formed therein. Instead, flow control valves 36A are located in piston 30A. In this arrangement, valves 60 which may, as illustrated, be in the form of shim valves, or other suitable hydraulic valves are attached to piston 30A and control the fluid flow passageways 36A depending upon the relative rotational direction of movement between the housing and piston.

FIG. 6 illustrates a basic damper F(V) (Force versus Velocity) graph calculated from the valve (or flow control passageway) characteristics of the toroidal rotary damper apparatus on the basis of study state analysis. For an open orifice damper, the damping force can be considered as proportional to piston speed, however, it is often desirable to include non-linear properties in the damping curve.

The toroidal rotary damper apparatus can use different flow control valve systems, such as the stacked-shims (spring plates) as shown or spring-loaded ball valves to modify the damping characteristics.

The graph of FIG. 6 illustrates F(V) damping characteristics achieved by various valve applications:

Graph A–B. Highly progressive damping curves achieved by various size open flow control passageways in the piston or fluid barriers and Graph C—Digressive damping curve achieved by stacked-shims in the piston or fluid barrier.

FIG. 8 illustrates an embodiment employing valves 60B to control damper fluid flow through flow control passageways formed in the fluid barrier.

FIG. 9 illustrates an embodiment of the invention wherein housing 10C accommodates therein two fluid barriers 34C fixed in position within the housing interior and spaced from one another to divide the housing interior into two separate chambers. Each of the chambers accommodates a piston 30C therein. Valves 60C are associated with each of the pistons.

Employing the arrangement of FIG. 9, each damping chamber can be designed with different damping characteristics in mind, e.g., one chamber can be solely dedicated to a compression cycle while the other chamber can be for extension or to provide intermediate or transitional damping characteristics. More than two fluid barriers can be employed so that more than two chambers are formed. The chambers can also contain fluids with different properties (i.e. viscosity, density, thermal expansion, etc.) to achieve desired final damping characteristics. Advantages are better dynamic torque distribution within the damper and improved thermal energy dissipation. Additionally, the opposing chambers can be interconnected via fluid passageways 79 across the shaft, effectively doubling piston surface area, hence doubling the damping force.

In the arrangement of FIG. 10, a plurality of pistons 30D (in this case two pistons) are affixed to the main rotating shaft 40D within the single chamber defined by fluid barrier 34D. This divides the damping load between multiple pistons, with each piston possibly having a specific damping characteristic. Advantages are larger damping surface area and hence damping forces, better dynamic torque distribution within the damper and improved thermal distribution of the fluid.

FIG. 11 is a somewhat schematic presentation of an embodiment of the apparatus having adjustable valves 60E utilized to control flow through flow control passageways 36E.

Valve adjustments are provided to modify operation of the damper, two different types of valve controls being shown. In one embodiment of valve control mechanism an adjustment screw 66 is associated with one of the valves 60E and may be threaded in or out relative to the housing to control how far its associated valve can be opened.

In the other valve control, a plunger 68 is associated with a different valve mechanism 60E to change the position of a needle valve. The plunger 68 extends from a servoactuator which may, for example, be electric or hydraulic in nature. The servoactuator 70 is operatively associated with a control unit or CPU 72 managed by discrete control strategies 74, adaptable during operation.

FIG. 12 discloses an embodiment wherein a housing 10F accommodates a fluid barrier 34F and a piston 30F. Also disposed within the housing interior is a low pressure preload structure for pressurizing damper fluid in the housing interior for temperature compensation, more particularly, a gas filled bladder 76. Damper preload can be adjusted by changing the pressure of the pressurized gas filled bladder.

FIG. 13 illustrates a housing 10G which includes enlarged flange segments forming opposed connector portions 78 having apertures 80 formed therein.

FIG. 14 shows the arrangement of FIG. 13 with the connector portions 78 secured by bolts 82 to brackets extending from fixed structural elements 84, 86. The shaft 40 and associated piston (not shown in FIG. 14) rotate relative to the fixed housing to perform the desired damping function.

FIG. 15 shows an embodiment wherein shaft 40 is attached to brackets of a structural element 88 and fixed against rotation relative thereto. In this arrangement, the housing 10I can rotate in a reciprocal manner about the shaft, the apparatus functioning as a rocker damper. Link members in the form of push-pull arms 90, 92 are connected to the housing 10I and reciprocally move fore and aft as the housing rocks back and forth. The toroidal rotary damper apparatus in this instance, due to its symmetrical geometry, effectively behaves as a rocker damper for opposing force vectors.

FIG. 16 illustrates a version of the toroidal rotary damper apparatus which is the same in all respects as the embodiment of FIGS. 1–5 except that the fluid barrier 34H is free of valves or passageways and flow control passageways 36H are defined by piston 30H. In this embodiment no valves are employed to control flow through the flow control passageways.

FIG. 17 illustrates a toroidal rotary damper apparatus A constructed in accordance with the teachings of the present invention employed in association with a vehicle suspension system B as a lever damper, the link member or arm C of the toroidal rotary damper apparatus A being connected to a pivoting link of the vehicle suspension and also affixed to the central shaft 40 of the apparatus. Housing 10 is fixed to the frame F of the vehicle.

FIG. 18 illustrates the housing 10 of toroidal rotary damper apparatus A' constructed in accordance with the teachings of the present invention affixed to the frame F of a vehicle. In this instance, the apparatus A' is disposed axially with the elongated element D of the suspension assembly which in turn is pivotally mounted on the vehicle frame F and fixedly connected to the ends of shaft 40 so that forces causing pivotal movement of the element D and the rest of the assembly will be dampened by apparatus A'.

FIG. 19 shows a toroidal damper apparatus A" wherein the shaft 40 is affixed against movement to a vehicle frame F. The housing 10 of the apparatus A" rotates relative to the shaft and the frame F. A link rod 94 interconnects the housing 10 to a pivoted element 96 of the suspension so that the apparatus A" functions as a shock absorber. This is representative of the fact that the toroidal rotary damper apparatus can be utilized to accept tangential force vectors using mechanisms like push-rods or pull-rods effectively acting as a damped rocker system.

Referring now to FIG. 20, the housing 10J of a toroidal rotary damper apparatus is affixed against movement. The apparatus incorporates a moveable output member or lever 98 extending from a planetary gear assembly associated with the housing. The assembly includes a sun gear 100 affixed to shaft 40 of the apparatus. The sun gear 100 is surrounded by planetary gears 102 which mesh with the sun gear and with a ring gear 104 fixed in place externally of housing 10J. The planetary gears are rotatably mounted at the inner end of output member 98. This arrangement multiples the motion ratio between the shaft 40 and the moveable output member 98, a feature useful under certain circumstances, such as lever arm and linkage applications.

FIG. 21 shows a toroidal rotary damper apparatus 10K integrated into an external housing structure 110 where only the shaft (shaft 112) protrudes from both sides of the housing. In this embodiment the housing can be of solid material to increase structural rigidity and thermal dissipation; or the housing can be vacant. When vacant, the housing can function as an expansion vessel to store and provide fluid; furthermore, in case of inner shaft seal failure, space is provided to store fluid escaping through the corresponding seal, which in turn can reduce the internal pressure. This feature substantially increases reliability and aids in prevention of contamination.

The invention claimed is:

1. Toroidal rotary damper apparatus comprising, in combination:
   a housing defining a housing interior for containing damper fluid, said housing interior at least partially formed by a toroidal inner housing surface disposed at least partially about and uniformly spaced from a central axis;
   a piston in said housing interior having a substantially circular outer peripheral piston surface extending at least substantially completely about said at least one piston in substantially fluid-tight engagement with said toroidal inner housing surface, said piston being spaced from said axis and said piston being movable relative to said housing within said housing interior along at least a portion of a circular path orthogonal to said axis and surrounding said axis with said substantially circular outer peripheral surface thereof always disposed coplanar with said axis and always uniformly spaced from said axis;

a fluid barrier attached to said housing and positioned in said housing interior;

a flow control passageway defined by either said piston or said fluid barrier for permitting controlled passage of damper fluid therethrough responsive to relative rotational movement between said piston and said housing to dampen forces applied to the toroidal damper apparatus causing said relative rotational movement, said housing interior along the length thereof having a uniform, substantially circular cross-section in the plane occupied by said substantially circular outer peripheral piston surface and said axis, and said housing substantially surrounding and engaging said substantially circular outer peripheral piston surface; and shaft co-axial with said axis extending through said housing interior along said axis orthogonal to said circular path, said shaft including a radially outwardly protruding member disposed within the housing engaging said piston, said shaft and said piston being jointly rotatably movable about said axis relative to said housing.

2. The toroidal rotary damper apparatus according to claim 1 wherein said piston includes an outer seal at least partially defining said substantially circular outer peripheral piston surface.

3. The toroidal rotary damper apparatus according to claim 1 wherein said flow control passageway is defined by said piston, said toroidal rotary damper apparatus additionally comprising a valve mounted on said piston for selectively regulating flow of damper fluid through said flow control passageway responsive to relative rotational movement between said piston and said housing.

4. The toroidal rotary damper apparatus according to claim 3 wherein said flow control passageway is one of a plurality of flow control passageways defined by said piston and wherein said valve is one of a plurality of valves mounted on said piston for selectively opening or closing said plurality of flow control passageways responsive to relative rotational movement between said piston and said housing.

5. The toroidal rotary damper apparatus according to claim 3 additionally comprising a valve control for controlling operation of said valve.

6. The toroidal rotary damper apparatus according to claim 3 wherein said valve is a spring valve.

7. The toroidal rotary damper apparatus according to claim 1 wherein said flow control passageway is defined by said fluid barrier, said toroidal rotary damper apparatus additionally comprising a valve mounted on said fluid barrier for selectively opening or closing said flow control passageway responsive to relative rotational movement between said piston and said housing.

8. The toroidal rotary damper apparatus according to claim 7 wherein said flow control passageway is one of a plurality of flow control passageways defined by said fluid barrier and wherein said valve is one of a plurality of valves mounted on said fluid barrier for selectively regulating flow of damper fluid through said plurality of flow control passageways responsive to relative rotational movement between said piston and said housing.

9. The toroidal rotary damper apparatus according to claim 1 wherein said piston is one of a plurality of pistons fixedly attached to said shaft, said pistons defining a space therebetween and radiating outwardly from said shaft.

10. The toroidal rotary damper apparatus according to claim 9 wherein at least one of said pistons defines said fluid flow passageway, said fluid flow passageway being in fluid flow communication with said space.

11. The toroidal rotary damper apparatus according to claim 9 wherein said fluid barrier is one of a plurality of fluid barriers positioned in said housing interior, said fluid barriers being spaced from one another to divide said housing interior into a plurality of chambers, each of said chambers accommodating a piston therein.

12. The toroidal damper apparatus according to claim 11 wherein said shaft defines fluid passageways in communication with said chambers.

13. The toroidal rotary damper apparatus according to claim 1 additionally comprising damper preload structure for pressurizing damper fluid in said housing interior.

14. The toroidal rotary damper apparatus according to claim 13 wherein said damper preload structure comprises a gas filled structure located in said housing interior and in direct contact with said damper fluid.

15. The toroidal rotary damper apparatus according to claim 1 wherein said housing includes at least one external connector portion for connecting said housing to a structural element.

16. The toroidal rotary damper apparatus according to claim 15 wherein said shaft is fixed against rotational movement whereby said housing will rotate about said shaft responsive to a force exerted on said housing by said structural element.

17. The toroidal rotary damper apparatus according to claim 1 wherein said housing includes two external connector portions spaced from one another for connecting said housing to two relatively movable structural elements.

18. The toroidal rotary damper apparatus according to claim 17 wherein said shaft is fixed against rotational movement whereby said housing will rotate about said shaft responsive to opposed forces exerted on said housing by said structural elements.

19. The toroidal rotary damper apparatus according to claim 1 additionally comprising at least one link member attached to said shaft and rotatable therewith.

20. The toroidal rotary damper apparatus according to claim 1 additionally comprising at least one link member connected to said housing and moveable responsive to rotatable movement of said housing about said shaft.

21. The toroidal rotary damper apparatus according to claim 1 additionally comprising a moveable output member, a gear assembly operatively associated with said moveable output member, said housing and said shaft to multiply the motion ratio between said shaft and said moveable output member.

22. The toroidal rotary damper apparatus according to claim 21 wherein said gear assembly comprises a planetary gear assembly affixed to said housing, a sun gear affixed to said shaft and planetary gears operatively engaged with said output member.

23. The toroidal rotary damper apparatus according to claim 1 wherein said shaft has at least one shaft end extending outwardly beyond said housing.

24. Toroidal rotary damper apparatus comprising, in combination:

a housing defining a housing interior for containing damper fluid, said housing interior at least partially formed by a toroidal inner housing surface disposed about and spaced from an axis;

a piston in said housing interior having a curved outer peripheral piston surface in substantially fluid-tight engagement with said toroidal inner housing surface, spaced from said axis and disposed along a common plane with said axis, said housing and said piston being relatively rotatably movable about said axis;

a fluid barrier attached to said housing and positioned in said housing interior; and a flow control passageway defined by either said piston or said fluid barrier for permitting controlled passage of damper fluid therethrough responsive to relative rotational movement between said piston and said housing to dampen forces applied to the toroidal damper apparatus causing said relative rotational movement, said housing including two adjoining housing members, each housing member defining a portion of said toroidal inner housing surface, said toroidal rotary damper apparatus additionally comprising connectors connecting together said housing members.

25. Toroidal rotary damper apparatus comprising, in combination:

a housing defining a housing interior for containing damper fluid, said housing interior at least partially formed by a toroidal inner housing surface disposed about and spaced from an axis;

a piston in said housing interior having a curved outer peripheral piston surface in substantially fluid-tight engagement with said toroidal inner housing surface, spaced from said axis and disposed along a common plane with said axis, said housing and said piston being relatively rotatably movable about said axis;

a fluid barrier attached to said housing and positioned in said housing interior;

a flow control passageway defined by either said piston or said fluid barrier for permitting restricted passage of damper fluid therethrough responsive to relative rotational movement between said piston and said housing to dampen forces applied to the toroidal damper apparatus causing said relative rotational movement; and a shaft extending from said housing interior along said axis and projecting outwardly from said housing, said shaft being fixedly connected to said piston, said housing and said shaft being relatively rotatably moveable, said housing including two adjoining housing members, each housing member defining a portion of said housing interior and further defining an opening receiving said shaft, said shaft having spaced shaft end segments, a shaft end segment extending outwardly from each of said openings and disposed outside said housing, at least one of said shaft end segments being a threaded shaft end segment, and said toroidal rotary damper apparatus additionally including a nut threaded on said threaded shaft end segment to maintain a connection between said shaft and said housing.

26. The toroidal rotary damper apparatus according to claim 25 additionally comprising compression seals positioned in said housing surrounding said shaft for maintaining pressure of damper fluid within said housing interior.

27. The toroidal rotary damper apparatus according to claim 26 additionally comprising radial seals positioned in said housing surrounding said shaft housing interior.

\* \* \* \* \*